US011609438B2

(12) United States Patent
Newman

(10) Patent No.: US 11,609,438 B2
(45) Date of Patent: Mar. 21, 2023

(54) OCULAR LENS WITH FRICTION CONTROL STRUCTURES

(71) Applicant: MENICON SINGAPORE PTE LTD., Singapore (SG)

(72) Inventor: Stephen D. Newman, Bayshore Park (SG)

(73) Assignee: Menicon Singapore Pte Ltd., Singapore (SG)

( * ) Notice: Subject to any disclaimer, the term of this patent is extended or adjusted under 35 U.S.C. 154(b) by 181 days.

(21) Appl. No.: 17/086,151

(22) Filed: Oct. 30, 2020

(65) Prior Publication Data

US 2021/0157169 A1 May 27, 2021

Related U.S. Application Data

(60) Provisional application No. 62/929,012, filed on Oct. 31, 2019.

(51) Int. Cl.
*G02C 7/04* (2006.01)

(52) U.S. Cl.
CPC ............. *G02C 7/048* (2013.01); *G02C 7/047* (2013.01); *G02C 7/049* (2013.01)

(58) Field of Classification Search
CPC ......... G02C 7/048; G02C 7/047; G02C 7/049
USPC .................................................... 351/159.02
See application file for complete search history.

(56) References Cited

U.S. PATENT DOCUMENTS

| 6,626,534 | B1 | 9/2003 | Dimartino | |
|---|---|---|---|---|
| 2007/0252947 | A1* | 11/2007 | Hsu | G02C 7/04 |
| | | | | 351/159.02 |
| 2011/0134387 | A1 | 6/2011 | Samuel et al. | |
| 2015/0153588 | A1* | 6/2015 | Angelini | G02C 7/049 |
| | | | | 351/159.04 |

FOREIGN PATENT DOCUMENTS

| EP | 0102223 A2 * | 8/1983 | ............. G02C 7/044 |
|---|---|---|---|
| WO | 8907281 A1 | 8/1989 | |
| WO | 8907303 A1 | 8/1989 | |
| WO | WO-2009137602 A1 * | 11/2009 | ........... A61K 31/568 |
| WO | WO-2014012016 A1 * | 1/2014 | ............. G02C 7/049 |
| WO | 2018135421 A1 | 7/2018 | |
| WO | WO-2018204395 A1 * | 11/2018 | ............. G02C 7/041 |

OTHER PUBLICATIONS

International Search Report and Written Opinion of PCT Application No. PCT/SG2020/050629 dated Feb. 2, 2021 (9 pages).

* cited by examiner

*Primary Examiner* — James R Greece
(74) *Attorney, Agent, or Firm* — Dorsey & Whitney LLP

(57) ABSTRACT

An ocular lens may include a lens body including a first surface. The first surface may include a first zone including a plurality of friction reduction structures arranged in alignment with the movement of a user's upper eyelid during blinking. The first surface may also include a second zone including a plurality of friction reduction structures arranged in alignment with the movement of a user's lower eyelid during blinking.

21 Claims, 10 Drawing Sheets

OCULAR LENS WITH FRICTION CONTROL STRUCTURES

CROSS-REFERENCE TO RELATED APPLICATION

This application claims the benefit of priority to U.S. Provisional Application No. 62/929,012 entitled "Ocular Lens with Friction Control Structures," filed 31 Oct. 2019, the disclosure of which is hereby incorporated by reference in its entirety.

FIELD

The present disclosure relates to the field of ocular lenses, particularly to ocular lenses having surface structures for controlling friction.

BACKGROUND

Eyelids are anatomical structures that both clean the eye and spread the lubricating ingredients that are present in tears. Eyelids provide a physical action to evenly distribute tears or tear fluid over the ocular surface and thus maintain a comfortable and microbiologically intact environment. When ocular lenses, such as contact lenses, are worn in the eye, tear film integrity may be disrupted by the bulk polymer properties of the lens, by the type or nature of the polymer itself, or by a combination of the two mechanisms. This phenomenon, in conjunction with the interaction of the lens polymer with the ambient environment, can create less than desirable wearing conditions for the user of the ocular lens. These less than desirable conditions are generally associated with reduced comfort and dryness in the user's eye. These conditions can result in shorter and sub-optimal lens wearing times and experiences for the user.

Friction between the lens and the anatomical structures of the eye may be the key to improving the comfort of contact lens wear. There are many approaches to controlling ocular lens friction in the art, some of which involve modifying chemical properties and some of which involve modifying physical properties. Chemical or physical surface modification is well known in the art, but generally has only been applied on a global basis to an ocular lens, that is, an entire lens surface may be subjected to surface modification with no regard to the directional movement of an eyelid over the lens. This blanket surface modification may not adequately control friction between the lens and an eyelid because each of the upper and lower eyelid behave differently during their blinking phase.

The upper eyelid is mainly controlled by the levitator superioris muscle and during a blinking phase has a predominantly vertical motion or direction of travel. The upper eyelid is physically stiffened by an internal structure called the tarsal plate, and as such will exhibit a higher surface force on the eye or ocular lens than the lower eyelid. The lower eyelid is mainly controlled by the obicularis oculi muscle and moves primarily in a nasal direction in a coordinated sweeping action with the upper lid during a blinking phase. The lower eyelid exhibits virtually no vertical movement at all.

The direction and amount of friction between an ocular lens on the eye and an eyelid may therefore be different for different sections of the lens, depending on which eyelid passes over the lens. The upper portion of the lens may be influenced by the stiffer and predominantly vertical action of the upper eyelid, while the lower area of the lens may be influenced by the softer, predominantly nasally oriented movement of the lower eyelid.

SUMMARY

According to the present disclosure an ocular lens may comprise a lens body including a first surface, the first surface including a first zone including a first plurality of friction reduction structures having a first orientation, and a second zone including a second plurality of friction reduction structures having a second orientation.

In some embodiments, the friction reduction structures comprise at least one patterned feature. In some embodiments, the patterned feature comprises a nano feature. In some embodiments, the patterned feature comprises a micro feature. In some embodiments, the patterned feature comprises a wave structure. In some embodiments, the first surface comprises an outer surface of the lens. In some embodiments, the first surface comprises an inner surface of the lens. In some embodiments, the first orientation is in alignment with a movement of an upper eyelid during blinking. In some embodiments, the second orientation is in alignment with a movement of a lower eyelid during blinking. In some embodiments, the plurality of friction reduction structures enhances the wettability of the first surface of the lens body. In some embodiments, the plurality of friction reduction structures promote a natural blink motion of an eyelid. In some embodiments, the first plurality of friction reduction structures extends across an entire width of the first zone. In some embodiments, the second plurality of friction reduction structures extends across and entire width of the second zone. In some embodiments, the plurality of friction reduction structures of one or more of the first zone and second zone are substantially parallel to one another. In some embodiments, each of the plurality of friction reduction structures of one or more of the first zone and second zone is defined by an arc and the plurality of friction reduction structures are arranged in a substantially concentric manner.

In some embodiments, the first orientation is substantially perpendicular to the second orientation. In some embodiments, the friction reduction structures comprise a combination of channels and ridges. In some embodiments, the friction reduction structures comprise a combination of indentations and protrusions. In some embodiments, the indentation or protrusions have a combination of substantially rounded profiles, substantially rectangular profiles, substantially triangular profiles, and irregularly shaped profiles.

In some embodiments, the ocular lens may further comprise an optic zone. In some embodiments, the first zone is disposed outside the optic zone and surrounds at least a portion of the optic zone. In some embodiments, the second zone is disposed outside the optic zone and the first zone. In some embodiments, the first zone extends from an edge of the lens body to a position on the first surface greater than one radius of the first surface away from the edge of the lens body. In some embodiments, the first zone extends from the edge of the lens body to a position on the first surface approximately ⅔ of a diameter of the first surface away from the edge of the lens body. In some embodiments, the second zone extends from an edge of the lens body to a position on the first surface less than one radius of the first surface away from the edge of the lens body. In some embodiments, the second zone extends from an edge of the lens body to a position on the first surface approximately ⅓ of a diameter of the first surface away from the edge of the lens body. In some embodiments, the second zone is substantially adjacent to the first zone. In some embodiments, the first zone and the second zone cover substantially all of the first surface. In some embodiments, the first zone and the second zone cover substantially all of the first surface outside of the optic zone.

In some embodiments, the optic zone has a toric, spherical, or multifocal geometry. In some embodiments the ocular lens may further comprise at least one stabilizing structure configured to engage a blinking eyelid and orient the ocular lens. In some embodiments, the ocular lens may further comprise a plurality of stabilizing structures disposed on a periphery of the ocular lens. In some embodiments, the plurality of stabilizing structures comprise a plurality of protrusions disposed at an interface between the first zone and the second zone. In some embodiments, the at least one stabilizing structure comprises a wave or a stria. In some embodiments, the ocular lens may further include one or more prisms formed along an outer edge of the lens body to substantially orient the lens body in a desired position on an eye.

In some embodiments, the ocular lens may further comprising a chemical surface modifier. In some embodiments, the chemical surface modifier comprises one or more of a hyalauronic acid (HA), carboxymethyl cellulose (CMC), polyethylene glycol (PEG), N-vinylpyrrolidone (NVP), and 2-methacryloyloxyethyl phosphorylcholine (MPC).

According to some embodiments, an ocular lens may comprise a lens body including a first surface, the first surface including an optic zone, a first zone including a first plurality of friction reduction structures having a first orientation in alignment with a movement of an upper eyelid during blinking, a second zone substantially adjacent to the first zone, including a second plurality of friction reduction structures having a second orientation in alignment with a movement of a lower eyelid during blinking, and at least one stabilizing structure configured to engage a blinking eyelid and orient the ocular lens.

In some embodiments, the friction reduction structures comprise at least one patterned feature. In some embodiments, the patterned feature comprises a nano feature. In some embodiments, the patterned feature comprises a micro feature. In some embodiments, the patterned feature comprises a wave structure. In some embodiments, the plurality of friction reduction structures enhances the wettability of the first surface of the lens body. In some embodiments, the plurality of friction reduction structures promote a natural blink motion of an eyelid. In some embodiments, the friction reduction structures comprise a combination of channels and ridges. In some embodiments, the friction reduction structures comprise a combination of indentations and protrusions. In some embodiments, the indentation or protrusions have a combination of substantially rounded profiles, substantially rectangular profiles, substantially triangular profiles, and irregularly shaped profiles.

In some embodiments, the ocular lens may further comprise a plurality of stabilizing structures disposed on a periphery of the ocular lens. In some embodiments, the plurality of stabilizing structures comprise a plurality of protrusions disposed at an interface between the first zone and the second zone. In some embodiments, the at least one stabilizing structure comprises a wave or a stria. In some embodiments, the ocular lens may further include one or more prisms formed along an outer edge of the lens body to substantially orient the lens body in a desired position on an eye. In some embodiments, the ocular lens may further comprise a chemical surface modifier. In some embodiments, the chemical surface modifier comprises one of a hyalauronic acid (HA), carboxymethyl cellulos (CMC), polyethylene glycol (PEG), N-vinylpyrrolidone (NVP), and 2-methacryloyloxyethyl phosphorylcholine (MPC).

According to some embodiments, an ocular lens may comprise a lens body including a first surface, the first surface including a first zone including a first plurality of friction reduction structures having a first orientation, the friction reduction structures comprising at one or more patterned nano or mirco features arranged substantially parallel to one another, and a second zone including a second plurality of friction reduction structures having a second orientation substantially perpendicular to the first orientation, the friction reduction structures comprising one or more patterned nano or micro structures arranged substantially parallel to one another.

In some embodiments, the patterned feature comprises a wave structure. In some embodiments, the first surface comprises an outer surface of the lens. In some embodiments, the first surface comprises an inner surface of the lens. In some embodiments, the first plurality of friction reduction structures extends across an entire width of the first zone. In some embodiments, the second plurality of friction reduction structures extends across and entire width of the second zone. In some embodiments, the friction reduction structures comprise a combination of channels and ridges. In some embodiments, the friction reduction structures comprise a combination of indentations and protrusions. In some embodiments, the indentation or protrusions have a combination of substantially rounded profiles, substantially rectangular profiles, substantially triangular profiles, and irregularly shaped profiles. In some embodiments, the ocular lens may further comprise an optic zone. In some embodiments, the ocular lens may further comprise at least one stabilizing structure configured to engage a blinking eyelid and orient the ocular lens. In some embodiments, the ocular lens may further comprise a chemical surface modifier.

According to some embodiments, an ocular lens may comprise a lens body including a first surface, the first surface including an optic zone, a first zone including a first plurality of friction reduction structures having a first orientation in alignment with a movement of an upper eyelid during blinking, the friction reduction structures comprising at least one patterned feature, a second zone including a second plurality of friction reduction structures having a second orientation in alignment with a movement of a lower eyelid during blinking, the friction reduction structures comprising at least one patterned feature, wherein the friction reduction structures are configured to promote a natural blink motion of an eyelid, and at least one stabilizing structure configured to engage a blinking eyelid and orient the lens body in a desired position on the eye.

In some embodiments, the plurality of friction reduction structures enhances the wettability of the first surface of the lens body. In some embodiments, the second zone is substantially adjacent to the first zone. In some embodiments, the first zone and the second zone cover substantially all of the first surface. In some embodiments, the first zone and the second zone cover substantially all of the first surface outside of the optic zone. In some embodiments, the optic zone has a toric, spherical, or multifocal geometry. In some embodiments, the ocular lens may further comprise a plurality of stabilizing structures disposed on a periphery of the ocular lens. In some embodiments, the plurality of stabilizing structures comprise a plurality of protrusions disposed at an interface between the first zone and the second zone. In some embodiments, the at least one stabilizing structure comprises a wave or a stria. In some embodiments, the ocular lens may further comprise a chemical surface modifier. In some embodiments, the chemical surface modifier comprises one of a hyalauronic acid (HA), carboxymethyl cellulos (CMC), polyethylene glycol (PEG), N-vinylpyrrolidone (NVP), and 2-methacryloyloxyethyl phosphorylcholine (MPC).

BRIEF DESCRIPTION OF THE DRAWINGS

The accompanying drawings illustrate various embodiments of the present apparatus and are a part of the specification. The illustrated embodiments are merely examples of the present apparatus and do not limit the scope thereof.

FIGS. 5A-F illustrate schematic diagrams of steps of a method of manufacturing an ocular lens including friction control structures.

Throughout the drawings, identical reference numbers designate similar, but not necessarily identical, elements.

DETAILED DESCRIPTION

Figure 1A:
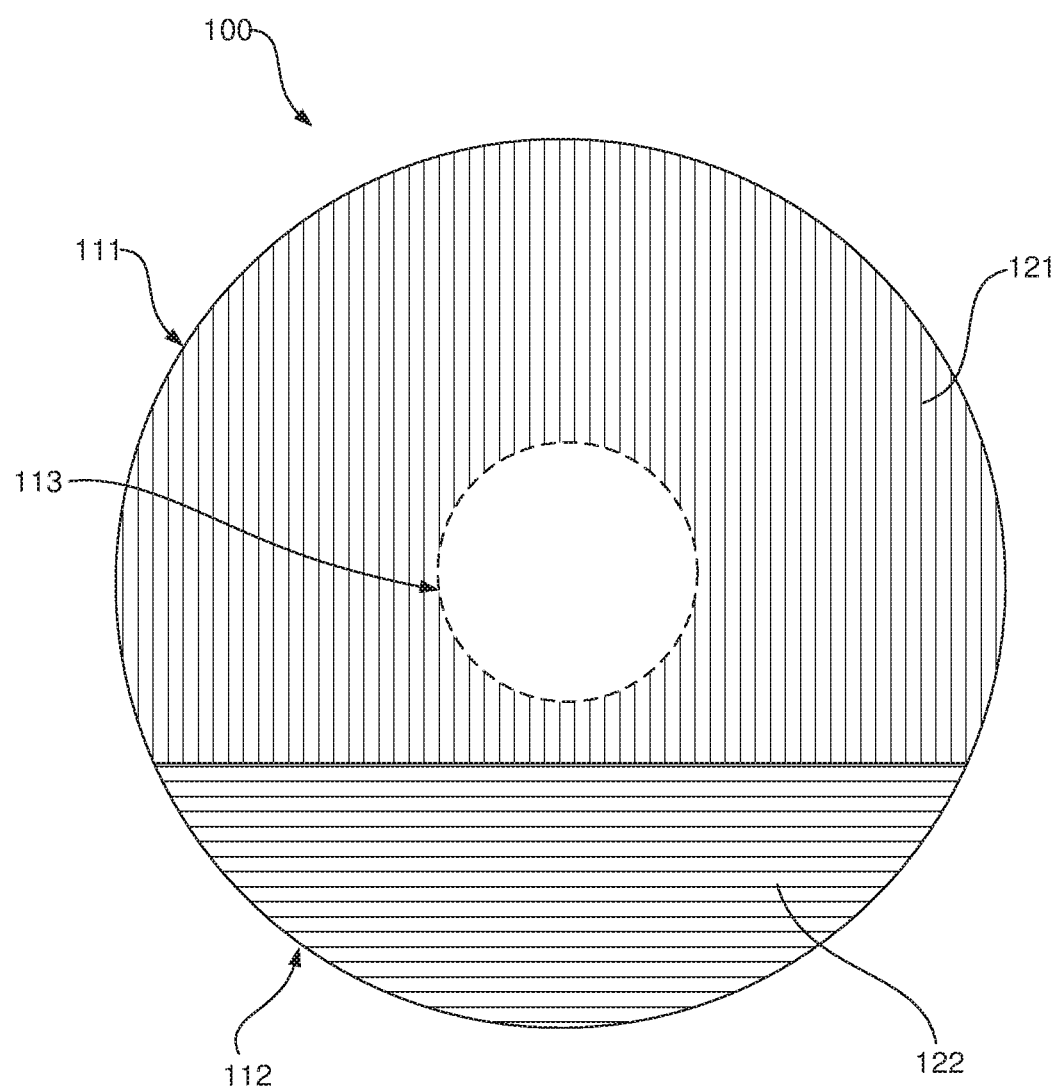
FIG. 1A is a top view of an ocular lens including friction control structures in accordance with the present disclosure.

The principles describe herein include an ocular lens having one or more surface features that may control the amount of friction between one or more surfaces of the ocular lens and a part or parts of a user's anatomy, such as an eyelid, when the ocular lens is worn on the user's eye. These friction control surface features may reduce the amount of friction between a user's eyelid and a surface of the ocular lens, for instance during blinking. In some cases, the surface features described herein may enhance the wettability of the surface of the ocular lens on which they are disposed. The reduced friction between a surface of the ocular lens and a user's eyelid, and/or the enhanced wettability or lubricity imparted by the surface features may result in increased comfort for the user when the lens is worn on the user's eye and may promote a natural blink motion of the eyelid. That is, the reduced amount of friction between the lid and the ocular lens may allow the eyelid to execute a blinking motion while encountering a lower amount of frictional resistance from the lens as compared with an ocular lens that does not include friction control features. This enhanced comfort can allow for a longer duration of wear for the lens, a decreased amount of inflammation or irritation caused by the lens, and numerous other benefits. Additionally, the surface features may assist in controlling the orientation of the ocular lens on the user's eye, thereby enabling the ocular lens to include bifocal optic features, toric optic features, and/or other orientation dependent features.

In some examples, the surface features may be surface structures, such as nano-scale or micro-scale structures. In some cases, the surface structures may include one or more patterned physical features, such as channels, ridges, indentations, wells, and protrusions. In some cases, the surface structures may have a macro-scale structure, such as a wave structure. In some cases, the surface structures may include a combination of nano-scale, micro-scale, and macro-scale structures. In some embodiments, a surface feature may include a chemically modified portion of a surface of the ocular lens. For instance, in some cases the surface features may be micro-scale or nano-scale portions of a surface of the ocular lens that include chemical surface modifiers, such as hyalauronic acid (HA), carboxymethyl cellulose (CMC), polyethylene glycol (PEG), N-vinylpyrrolidone (NVP), and 2-methacryloyloxyethyl phosphorylcholine (MPC), or combinations thereof. In some embodiments, the surface features may include physical structures such as nano-scale or micro-scale structures as well as chemical surface modifiers that can be located on, adjacent to, or at any desired location relative to the nano-scale or micro-scale structures.

In some examples, friction controlling surface features may be disposed on an inner, eye-facing surface of the ocular lens. In some examples, friction controlling surface features may be disposed on an outer surface of the ocular lens. In some examples, surface features may be disposed on an inner and an outer surface of the ocular lens.

In order to control the amount of friction between the ocular lens and, for example, the user's eyelid, the surface features may be substantially aligned in a particular orientation. In some examples, each of the one or more surface features may be positioned on the ocular lens in a particular orientation. In those embodiments where the surface features include patterned features, the features themselves may be positioned in a particular orientation, and/or the pattern may have a particular orientation.

In some examples, a surface of the ocular lens may include one or more zones, and surface features disposed in each zone may have different orientations relative to one another. For example, a surface of the ocular lens may include a first zone with a first plurality of surface features having a first orientation, and a second zone with a second plurality of surface features having a second, different orientation. In some examples, the orientation of the surface features in the one or more zones may be substantially aligned with the direction of movement of a user's eyelid over that zone when the lens is worn on the eye in a desired orientation. For example, a surface of the ocular lens may include a first upper zone and a second lower zone. The surface features of the first upper zone may have an orientation aligned with or corresponding to the predominant direction of movement of the user's upper eyelid, while the surface features of the second lower zone may have an orientation aligned with or corresponding to the predominant direction of movement of the user's lower eyelid.

The surface features of the ocular lens can help to control or stabilize the orientation of the ocular lens on the user's eye in some examples. In some examples, the surface features may control or stabilize the orientation of the ocular lens on the user's eye in addition to controlling friction as described herein. In some examples, the ocular lens may also include one or more additional stabilizing features, such as one or more protrusions, striae, waves, or prisms that substantially orient the lens in a desired position on the user's eye. Where the ocular lens includes lens stabilization features, as described herein, the stable orientation of the lens on the user's eye may allow for the orientation of friction controlling surface features to substantially align with an eyelid's predominant direction of travel. This alignment of the orientation of friction controlling surface features with the predominant direction of movement of an eyelid may allow for a reduced level of friction between the eyelid and the surface of the ocular lens.

Figure 1B:
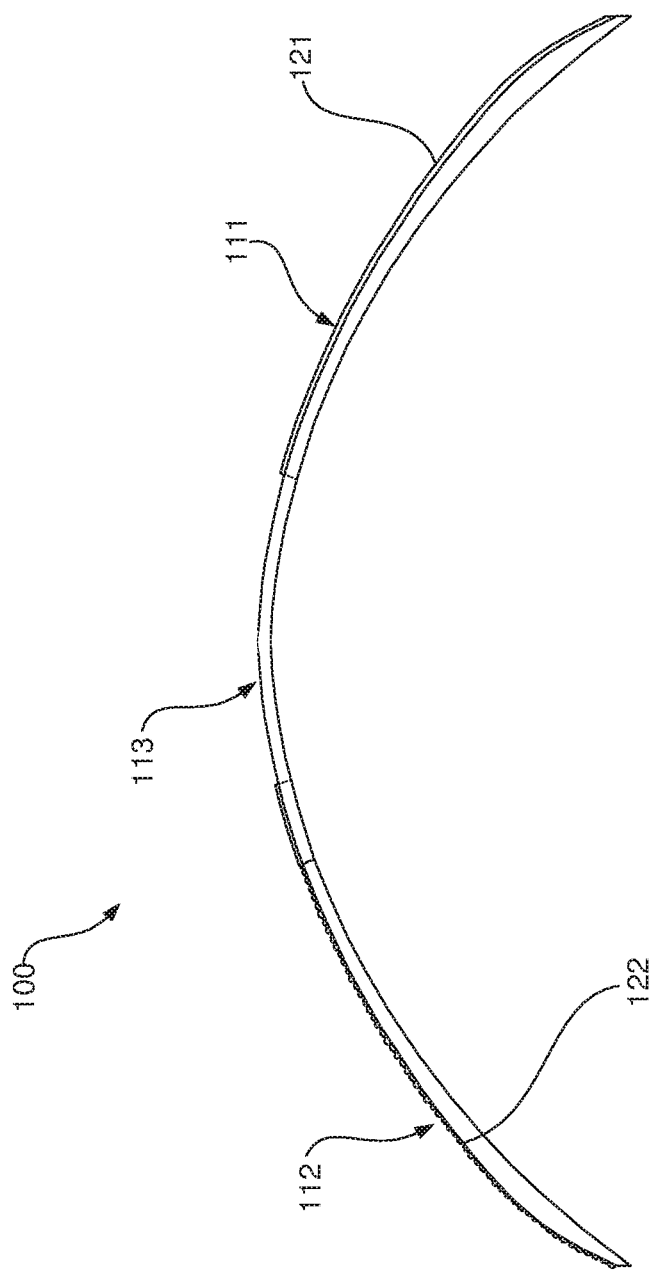
FIG. 1B is a side view of an ocular lens including friction control structures in accordance with the present disclosure.

FIGS. 1A and 1B depict an example of an ocular lens 100 formed of a lens material and including a first surface, otherwise referred to as an eyelid-facing, environmental-facing, or non-eye-facing surface. The first surface may include a first zone 111 and a second zone 112. In some cases, the first surface of the ocular lens 100 may include an optic zone 113.

The lens material may comprise any material suitable for use as an ocular lens or contact lens. That is, in some examples, the lens material may comprise a typical hydrogel contact lens. For example, the lens material may comprise a transparent polymer material, such as a hydrogel. In some examples, the lens material may comprise a silicone hydrogel material.

According to some examples, the first zone 111 of the first surface may include a plurality of friction control structures 121. In some examples, the friction control structures 121 may be friction reduction structures. According to the present example, the first zone 111 includes a plurality of friction control structures 121, where the friction control structures 121 include one or more patterned features. In some examples, a patterned feature of a friction control structure 121 may be a nano-scale feature and/or a micro-scale feature as described further herein. In some examples, a patterned features may have an undulating or wave structure. For example, a patterned feature may include an undulation or wave on the first surface having a nano-scale or micro-scale height difference between a peak and a trough. In some cases, a wave structure may include any number of peaks and troughs, from between about 1 to about 10, 100, 1000, or 10,000 or more. It should be noted that the features depicted in the Figures, including at least FIGS. 1A and 1B may not be shown to scale and may be enlarged for illustrative purposes.

In some examples, the friction control structures 121 may not diffract light and may not inhibit the clarity of the ocular lens 100 as detected by the eye. In some examples, the friction control structures 121 may enhance the wettability or lubricity of the first zone 111 of the ocular lens 100. In this way, the friction control structure 121 can provide a reduced level of friction between the eye and the eyelid by retaining a desired amount of liquid or lubricating fluid via the friction control structures 121 between the ocular lens 100 and the eyelid. In some examples, the friction control structures 121 may reduce, break up, or disperse any tear film on the lens 100. In some examples, the friction control structures 121 may enhance fluid, such as tear fluid, transport on the lens 100, thereby providing for a more uniform and even distribution of lubricating tear fluid in the first zone 111.

The friction control structures 121 of the first zone 111 may be disposed, positioned, or formed such that they have a first orientation. As used herein, the orientation of the one or more friction control structures 121 may be understood as describing the substantial alignment of the one or more patterned features of the friction control structures 121 with single direction or range of directions. In some examples, the orientation of the friction control structures 121 may refer to the alignment of a path of least resistance or lowest friction for an eyelid moving over each friction control structure 121. In some examples, the orientation of the friction control structure 121 may refer to the alignment of a largest or smallest lateral dimension of a friction control structure 121 with a desired direction.

In some examples, the orientation of the friction control structures 121 of the first zone 111 may be approximately vertically aligned when the ocular lens 100 is worn on a user's eye. In some examples, the orientation of the friction control structures 121 may be substantially aligned with the predominant direction of motion of a user's upper eyelid when the ocular lens 100 is worn on a user's eye. In some cases, where the friction control structures 121 of the first zone 111 are oriented in alignment with the predominant direction of motion of the user's upper eyelid, the friction control structures 121 may reduce the amount of friction between the user's upper eyelid and the first zone 111 relative to other alignments of the friction control structure 121. This reduction in friction between the user's eyelid and the first zone 111 may promote or facilitate the natural blink motion of the user.

Further, in those examples where the friction control structures 121 are oriented to reduce the amount of friction between the first zone 111 and the upper eyelid in the eyelid's predominant direction of motion, the friction control structures 121 may serve to stabilize the position of the ocular lens 100 on the user's eye. The orientation of the friction control structures 121 may provide a path of least resistance or friction for the eyelid travelling over the first surface. In the event that the ocular lens 100 rotates or otherwise moves out of position on the user's eye, this path of least resistance will no longer be substantially aligned with the eyelid's predominant direction of motion. When the user then blinks, the upper eyelid may exert a force on the first surface that causes the lens 100 to become repositioned on the eye so that the path of least resistance again aligns with vertical motion of the upper eyelid. In this way, the friction control structures 121 of the first zone 111 may serve to stabilize the position or orientation of the ocular lens 100 on the user's eye.

As shown in FIG. 1A, in some examples, one or more of the friction control structures 121 may extend substantially across an entire height or width of the first zone 111. In some examples, one or more of the friction control structures 121 may extend at least partially across the first zone 111. In some examples, one or more of the friction control structures 121 may extend straight, or substantially straight across at least a portion of the first zone 111. However, in some examples, one or more of the friction control structures 121 may have an arced or curved shape. For example, one or more of the friction control structures 121 may have a shape defined by an arc over the surface of the first zone 111.

In some examples, and as shown in FIG. 1A, each of the friction control structures 121 may be positioned substantially parallel to one another on the first zone 111. That is, where the friction control structures 121 have a first orientation, each of the friction control structures 121 may thus be positioned parallel to one another in the first orientation. In some examples where one or more of the friction control structures 121 has a curved or arced shape, the friction control structures 121 may be arranged in a substantially concentric manner.

The ocular lens 100 depicted in FIGS. 1A and 1B also includes a second zone 112 of the first surface. This second zone 112 may include a second plurality of friction control structures 122. In some examples, the friction control structures 122 may be friction reduction structures. According to some examples, the second zone 112 includes a plurality of friction control structures 122, where the friction control structures 122 include one or more patterned features. In some examples, a patterned feature of a friction control structure 122 may be a nano-scale feature and/or a micro-scale feature as described further herein. In some examples, patterned features may have an undulating or wave structure.

In some examples, a friction control structure 122 of the second zone 112 may be substantially similar to a friction control structure 121 of the first zone 111 as described herein, although the friction control structure 122 may have a different orientation or size.

In some examples, the friction control structures 122 may not diffract light and may not inhibit the clarity of the ocular lens 100 as detected by the eye. In some examples, the friction control structures 122 may enhance the wettability or lubricity of the second zone 112 of the ocular lens 100. In some examples, the friction control structures 122 may reduce the break up or dispersion of any tear film on the lens 100. In some examples, the friction control structures 122 may enhance fluid, such as tear fluid, transport to desired areas of the lens 100.

The friction control structures 122 of the second zone 112 may be disposed, positioned, or formed such that they have a second orientation. In some examples, the orientation of the friction control structures 122 may refer to the alignment of a path of least resistance or lowest friction for an eyelid moving over each friction control structure 122. In some examples, the orientation of the friction control structure 122 may refer to the alignment of a largest or smallest lateral dimension of a friction control structure 122 with a desired direction.

In some examples, the orientation of the friction control structures 122 of the second zone 112 may be approximately horizontally aligned when the ocular lens 100 is worn on a user's eye. In some examples, the orientation of the friction control structures 122 may be substantially aligned with the predominant direction of motion of a user's lower eyelid when the ocular lens 100 is worn on a user's eye. In some examples, where the friction control structures 122 of the first zone 112 are oriented in alignment with the predominant direction of motion of the user's lower eyelid, the friction control structures 122 may reduce the amount of friction between the user's lower eyelid and the second zone 112. This reduction in friction between the user's eyelid and the second zone 112 may promote or facilitate the natural blink motion of the user.

In some examples, the friction control structures 122 of the second zone 112 may function similarly to the friction control structures 121 of the first zone 111 with respect to stabilizing the position of the ocular lens 100 on the eye and reducing friction between the second zone 112 and the user's lower eyelid.

As shown in FIG. 1A, in some examples, one or more of the friction control structures 122 may extend substantially across an entire height or width of the second zone 112. In some examples, one or more of the friction control structures 122 may extend at least partially across the second zone 112. In some examples, one or more of the friction control structures 122 may extend straight, or substantially straight across at least a portion of the second zone 111. However, in some embodiments, one or more of the friction control structures 122 may have an arced or curved shape over the surface of the second zone 112. For example, one or more of the friction control structures 122 may have a shape defined by an arc.

In some examples, and as shown in FIG. 1A, each of the friction control structures 122 may be positioned substantially parallel to one another on the second zone 112. That is, where the friction control structures 122 have a second orientation, each of the friction control structures 122 may thus be positioned parallel to one another in the second orientation. In some examples where one or more of the friction control structures 122 has a curved or arced shape, the friction control structures 122 may be arranged in a substantially concentric manner.

As can be seen in FIG. 1A, the friction control structures 121 of the first zone 111 may be oriented substantially perpendicular to the friction control structures 122 of the second zone 112. That is, in some examples, the friction control structures 121 have a first orientation that is perpendicular to the second orientation of the friction control structures 122. In some other examples, however, the first orientation may be substantially parallel to or have some other spatial relationship to the second orientation.

The ocular lens 100 depicted in FIGS. 1A and 1B includes a first zone 111 that extends from the edge of the first surface ocular lens 100 to a position about ⅔ of a diameter of the ocular lens 100 away from the edge on the first surface. In some examples, the first zone 111 may extend from an edge of the ocular lens 100 to a position on the first surface greater than about one radius of the first surface or ocular lens 100 away from the edge of the ocular lens.

In the illustrated example, the second zone 112 covers the remainder of the first surface outside of the first zone 111 and optic zone 113. That is, in some examples, the second zone may 112 extend from an edge of the ocular lens 100 to a position about ⅓ away from the edge on the first surface. In some examples, the second zone 112 may extend from an edge of the ocular lens 100 to a position on the first surface less than about one radius of the first surface or ocular lens 100 away from the edge of the ocular lens. In some examples, the first zone 111 and second zone 112 may thus cover substantially all of the first surface outside of the optic zone 113.

The first zone 111 is substantially adjacent to the second zone 112 on the first surface in the examples shown in FIGS. 1A and 1B. In some examples, however, the first and second zones 111, 112 may not be substantially adjacent to or abut one another. Further, in some examples the first and second zones 111, 112 may not cover the entirety of the first surface and may only cover a portion thereof. In some examples, one or both of the first zone 111 and second zone 112 may extend partially or entirely into the optic zone 113, if an optic zone 113 is present on the lens 100.

In some examples, the first zone 111 may cover a portion of the first surface having any desired shape and area. The first zone 111 of FIGS. 1A and 1B includes an approximately half-circle shape, however, in other examples, the first zone 111 may have a circular shape, rectangular shape, triangular shape, or any other desired shape. The second zone 112 may similarly have any desired shape and area on the first surface.

Although the examples depicted in FIGS. 1A and 1B include a first zone 111 and a second zone 112, any number of zones may be present on the first surface of the ocular lens 100. Further, each of these zones may include one or more friction control structures, where the friction control structures of a zone all have an orientation, for example an orientation different from the orientation of the friction control structures of the other zones.

The lens material may include an optic area or zone 113 positioned at the center of the ocular lens 100. The optic zone 113 is typically about the same size as the pupil of the eye in low-light conditions, for example the optic zone 113 may have a diameter of about 10 millimeters. The optic zone 113 may contain the corrective power of the ocular lens 100, if any corrective power is present. According to some examples, the optic zone 113 may not include any friction control structures or features. In some other examples, one or more friction control structures as described herein may be present in the optical zone. In some examples, the friction control structures 121, 122 of the first zone 111 or second zone 112 may extend into or be disposed on all or part of the optic zone 113. In some examples where the optic zone 113 may contain corrective power, the optic zone 113 may have a toric, spherical, or multifocal geometry. In some examples, the optic zone 113 may have any form of corrective or optical geometry that exists in the art or will be developed in the future.

Figure 2A:
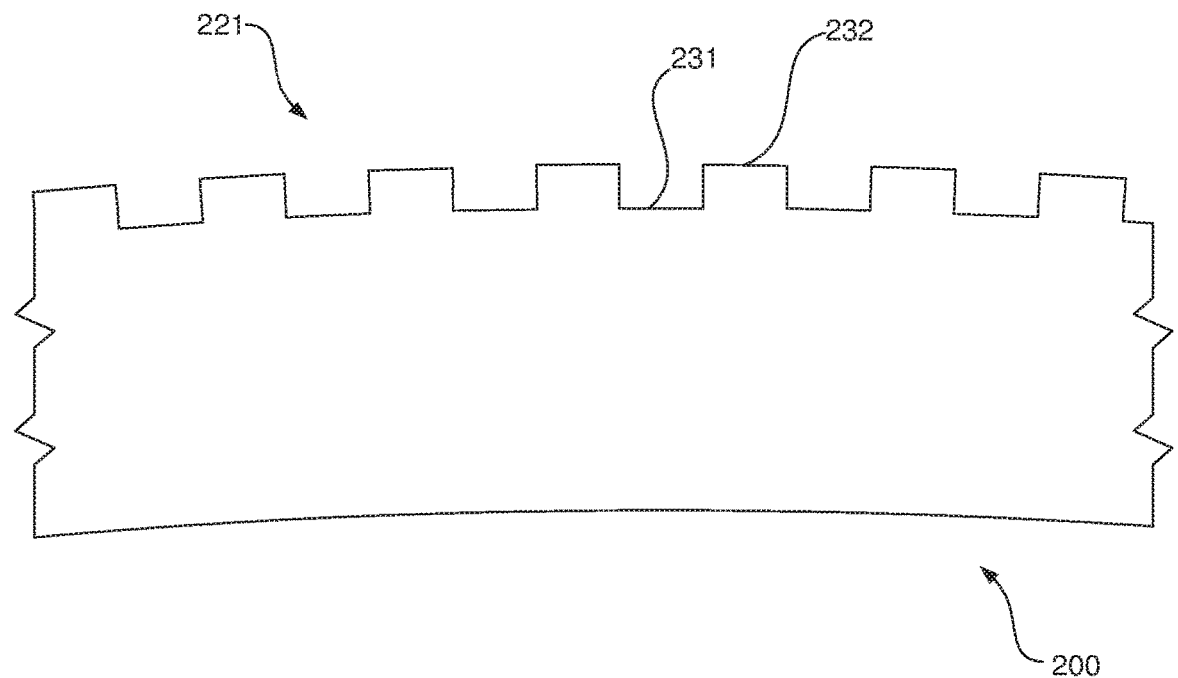
FIGS. 2A-D are profile views of friction control structures on an ocular lens in accordance with the present disclosure.
Figure 2B:
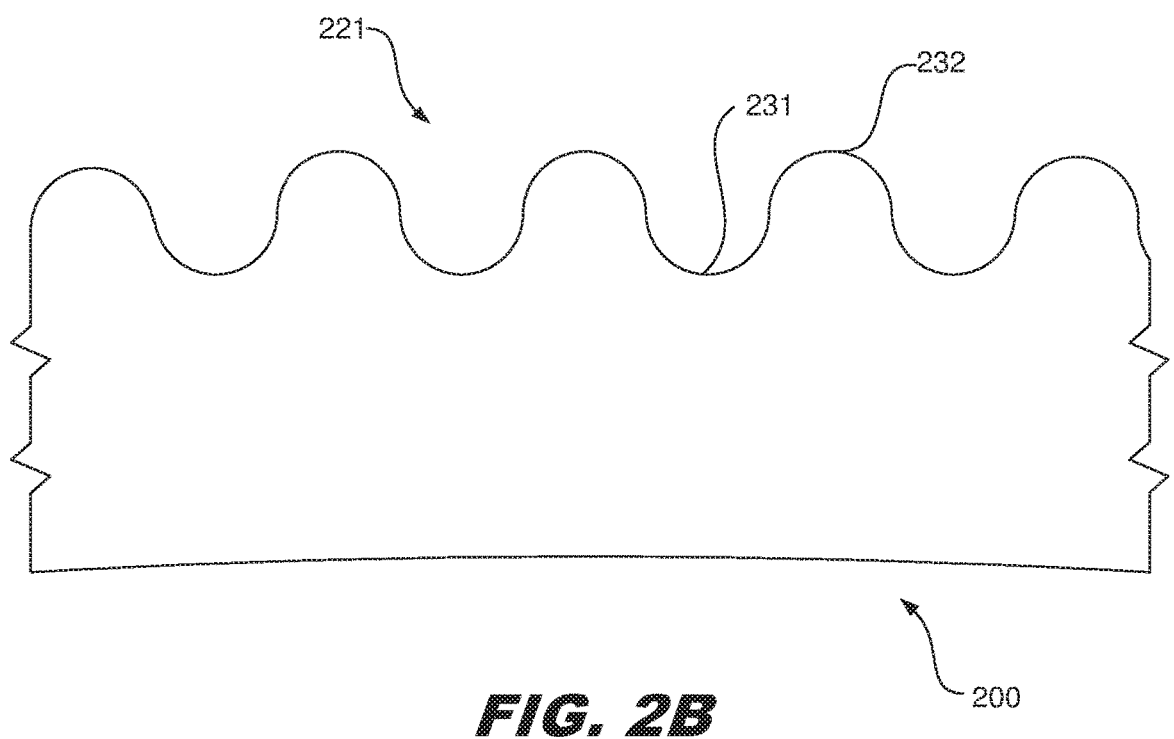

FIG. 2A illustrates a profile or cross-sectional view of an exemplary friction control structure 221, which may be a friction reduction structure, on a first or second zone of an ocular lens 200. The friction control structure 221 and the lens 200 can be substantially similar to, and include any or all of the features of the structures and lenses described herein, such as friction control structure 121 and lens 100. In some examples, the friction control structure 221 may be a patterned feature including a plurality of repeating physical structures. As can be seen in FIG. 2A, in some examples the repeating physical structures may include a combination of indentations 231 and protrusions 232. In this particular examples, the indentations 231 and protrusions 232 may have a substantially rectangular profile. In some examples, such as illustrated in FIG. 2B, the indentations 231 and protrusions 232 may have a substantially rounded profile. In some examples, the indentations 231 or protrusions 232 may have substantially rectangular profiles, substantially rounded profiles, substantially triangular profiles, irregularly shaped profiles, or combinations thereof. For example, the indentations 231 may have a substantially rectangular profile while the protrusions 232 may have a substantially rounded profile.

Figure 2C:
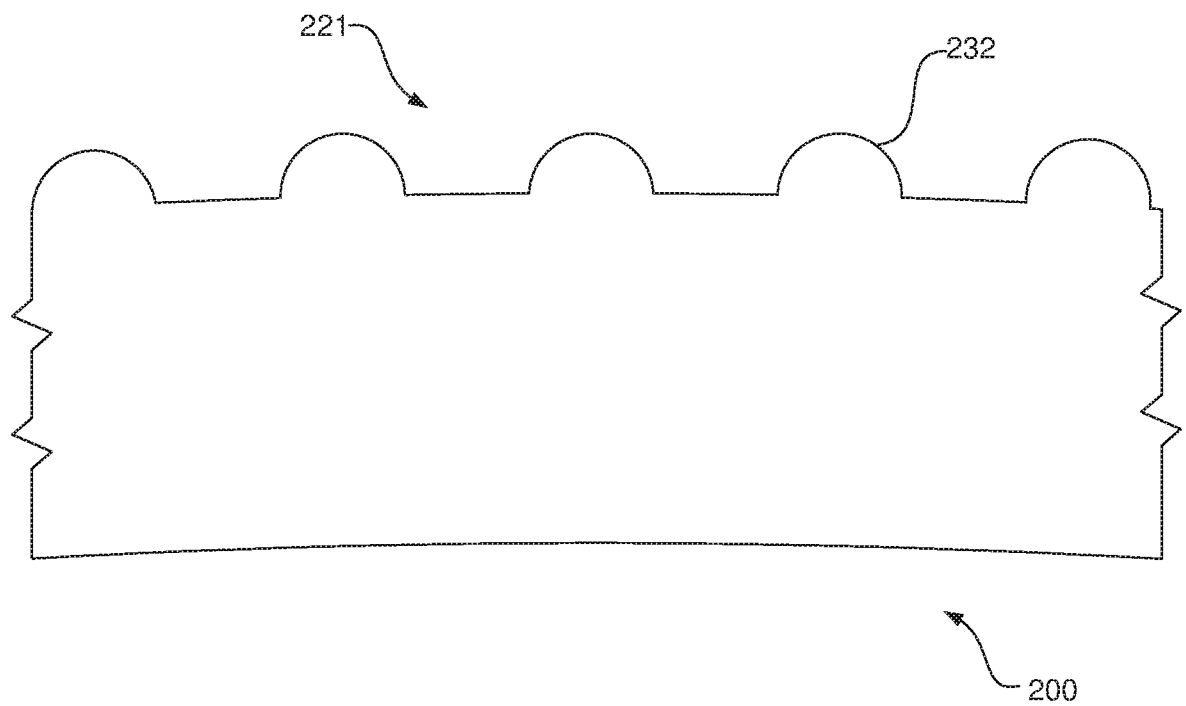
Figure 2D:
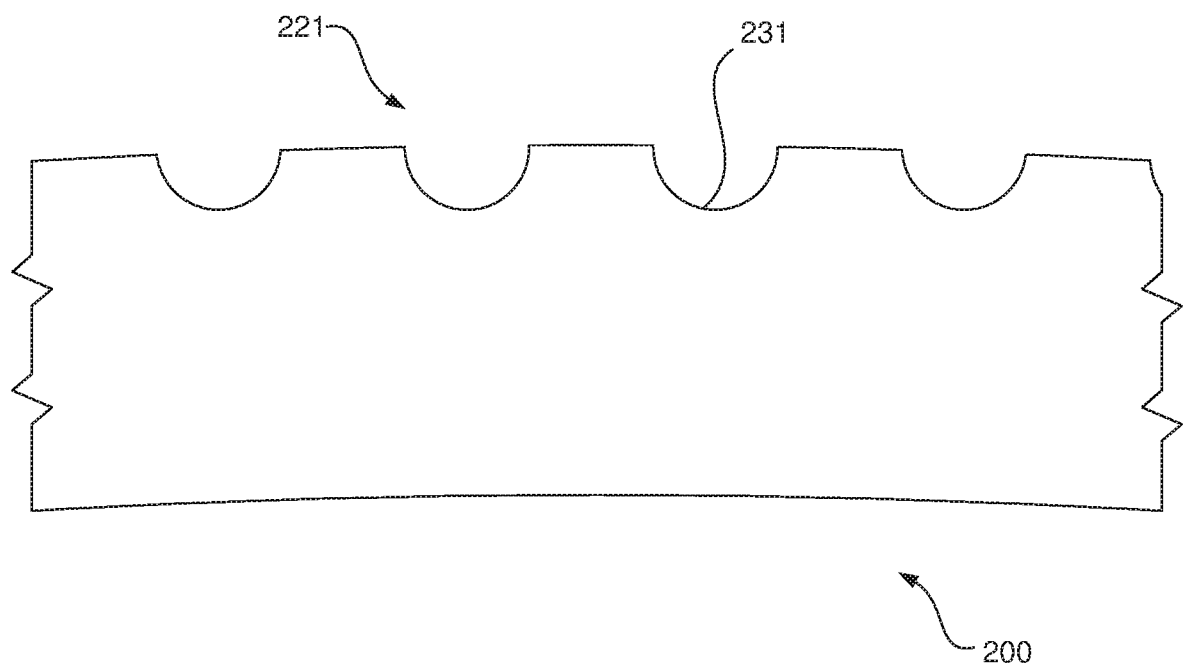

In some examples, and as depicted in FIG. 2C, a friction control structure 221 may include protrusions 232 and may not include indentations. In some examples, and as depicted in FIG. 2D, a friction control structure 221 may include indentations 231 and may not include protrusions. In some examples, a friction control structure 221 may include any number or combination of indentations 231 and/or protrusions 232 disposed in any arrangement.

In some examples, a friction control structure may include one or more channels and/or ridges. In some examples, each channel or ridge of the friction control structure may extend an entire length of the friction control structure, or may extend only a partial length of the friction control structure. In some examples where a channel or ridge may not extend the entire length of the friction control structure, the structure may include a plurality of channels and/or ridges. In some examples, the channels and/or ridges of a friction control structure may be positioned in line, or parallel, with the orientation of the friction control structure. In some other examples, however, a channel or ridge of the friction control structure may be positioned perpendicular or may have some other spatial relationship with the orientation of the friction control structure.

In some examples, the indentations 231 and ridges 232 illustrated in FIGS. 2A-D can extend a desired distance to define a ridge and/or channel. That is, the indentations 231 and ridges 232 illustrated in FIGS. 2A-D can extend a desired distance into or out of the page to define one or more ridges and/or channels. In some examples, the indentations 231 and/or ridges 232 illustrated in FIGS. 2A-D can be or define nano-structure or micro-structured wells. That is, in addition to repeating laterally as illustrated, the friction control structure 221 can include repeated indentations 231 and/or ridges 232 extending into and/or out of the page across the first surface of the lens 100 and separate by portions of lens material. Accordingly, in some examples, the indentations 231 and/or wells defined by the indentations 231 and/or ridges 232 can provide a super-wetting surface to enhance the wetting and fluid transport of the surface of the lens 100.

In some examples, the friction control structure 221 including one or more wells can contain liquid, such as tear fluid or another lubricating fluid when the ocular lens 100 is worn by a user. Thus, the friction control structure 221 can provide improved lubricity due to reduced fluid transport by retaining liquid within the wells, while also providing for increased fluid transport when pressure is exerted on the lens 100, for example by an eyelid during blinking. These selective levels of fluid transport can be achieved because pressure exerted by the eyelid during blinking can deform the indentations 231, protrusions 232, and/or wells defined thereby, thus allowing fluid to escape. When no pressure is exerted on the lens 100, however, the indentations 231, protrusions 232, and/or wells can maintain their structure and retain a desired amount of liquid therein to provide increased wetting.

The physical features that may comprise a friction control structure, such as a repeating physical feature of friction control structure 221 and/or a friction control structure including channels and/or ridges may be nano-scale, micro-scale, or combinations thereof. In some examples, a physical feature of a friction control structure may have major dimension of from about 10 nm to about 100 nm, about 250 nm, about 500 nm, or up to about 1 mm, 2 mm, 3 mm, 5 mm, or 10 mm or more. In some examples, the physical features comprising a friction control structure may all have substantially similar major dimensions. In some examples, a friction control structure may include a plurality of physical features having a range of major dimensions. For example, a friction control structure may include one or more physical features having a nano-scale major dimension and one or more physical features having a micro-scale major dimension. In some examples, the major dimension of the protrusions 232 can be a height or distance above the lens 100 surface, as well as a width and/or length. Similarly, in some examples, the major dimension of an indentation 231 can be a depth or distance below the lens 100 surface, as well as a width and/or length.

As described herein, in some examples, a friction control structure may include a macro-scale physical features, such as a wave structure. In some examples, a friction control structure may include a combination of the nano-scale and/or micro-scale physical features described herein, for example with regard to FIGS. 2A-D, and a macro-scale structure, such as a wave structure.

In some examples, the physical features of a friction control structure as described herein may be formed of the same or a similar material to the lens material, such as a silicone and/or hydrogel material. In some examples, the physical features may comprise one or more other polymer materials. In some examples, one or more physical features may be formed by an additive process. For example, a physical feature may be formed by a casting process, a molding process, a printing process, a stamping process, a liquid or vapor deposition process, or combinations thereof. In some examples, a physical feature may be formed at the same time as the ocular lens body. In some examples, a physical feature may be formed separate from the lens body and subsequently attached or adhered thereto. In some examples, a physical feature may be formed subsequent to the formation or curing of the lens body. In some examples, a physical feature may be formed by a subtractive manufacturing process. For example, a physical feature may be formed by etching, such as plasma etching, lithography, machining, drilling, lathing, or some other subtractive process, or combinations thereof. In some examples, one or more physical features may be formed from an additive process while one or more other physical features may be formed from a subtractive process. In some examples, one or more physical features may be formed by a combination of additive and subtractive processes.

In some examples, a friction control structure, such as a friction reduction structure, may include a chemical surface modifier. For example, a friction control structure may include a portion of a surface of the ocular lens that includes one or more chemical surface modifiers. In some examples, a chemical surface modifier may include one or more of hyalauronic acid (HA), carboxymethyl cellulose (CMC), polyethylene glycol (PEG), N-vinylpyrrolidone (NVP), 2-methacryloyloxyethyl phosphorylcholine (MPC), and other similar organic compounds.

In some examples, a friction control structure may include a portion or portions of a surface of the ocular lens including a chemical surface modifier, where the portion or portions may be arranged in a pattern and may have an orientation. For example, a friction control structure may include a plurality of repeating portions of a surface of the ocular lens arranged in a substantially vertical, horizontal, or other orientation when the lens is worn on the user's eye. In some examples, a friction control structure including a chemical surface modifier may include a plurality of portions of a surface of the lens oriented in line with the predominant direction of movement of an eyelid, such as an upper or lower eyelid.

In some examples, a friction control structure may include one or more physical structures, for example patterned nano-scale or micro-scale structures as described herein, where at least a portion of the physical structures includes a chemically modified surface. In some examples, a friction control structure may include one or more physical structures and one or more portions of a surface of the ocular lens that have been chemically modified. Further, in some examples, a friction control structure may include any combination of physical structures or features as described herein, where one or more portions of the physical structures, and/or one or more portions of a surface of the ocular lens may include a chemically modified surface.

Figure 3A:
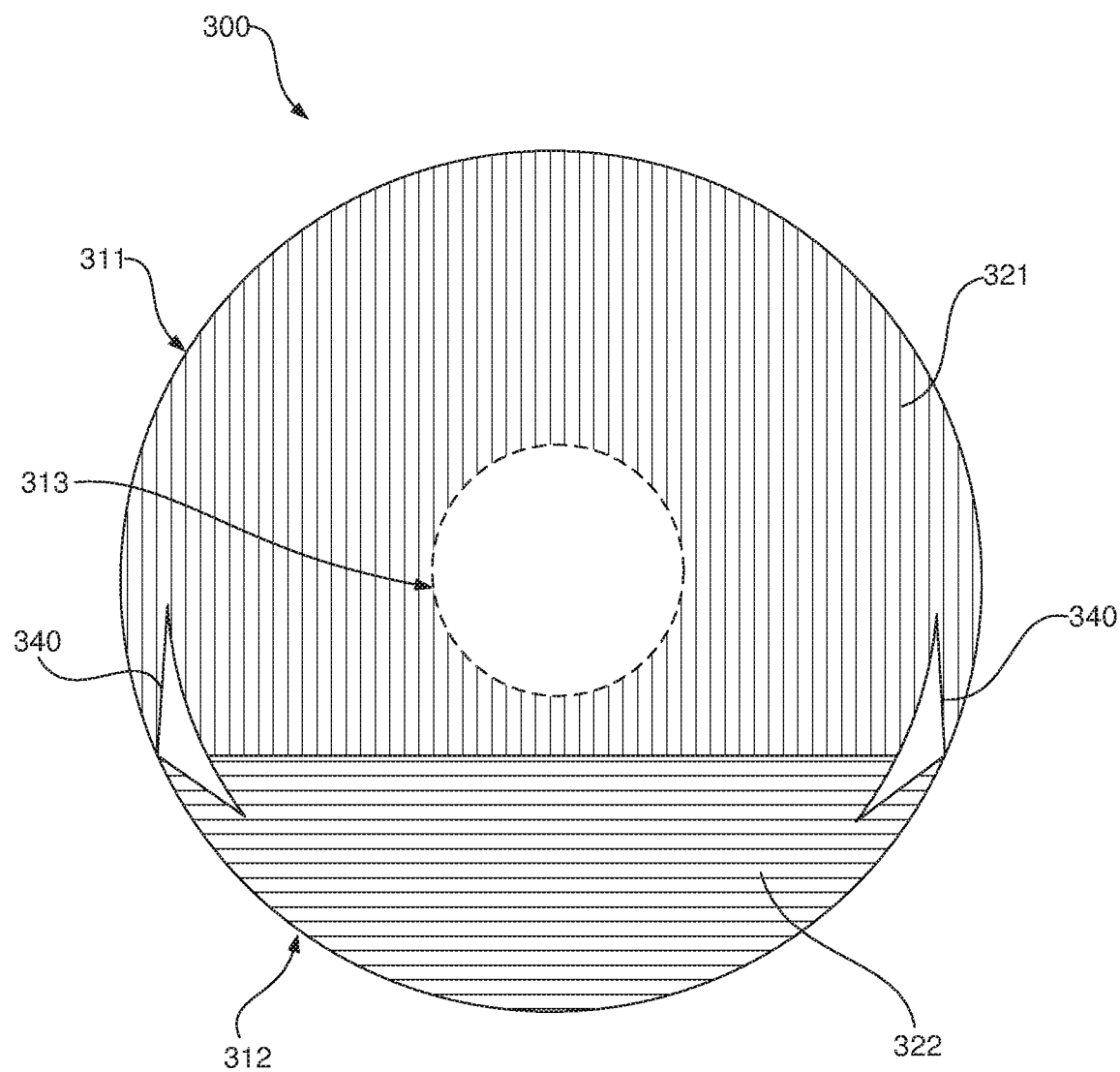
FIG. 3A is a top view of an ocular lens including friction control structures in accordance with the present disclosure.
Figure 3B:
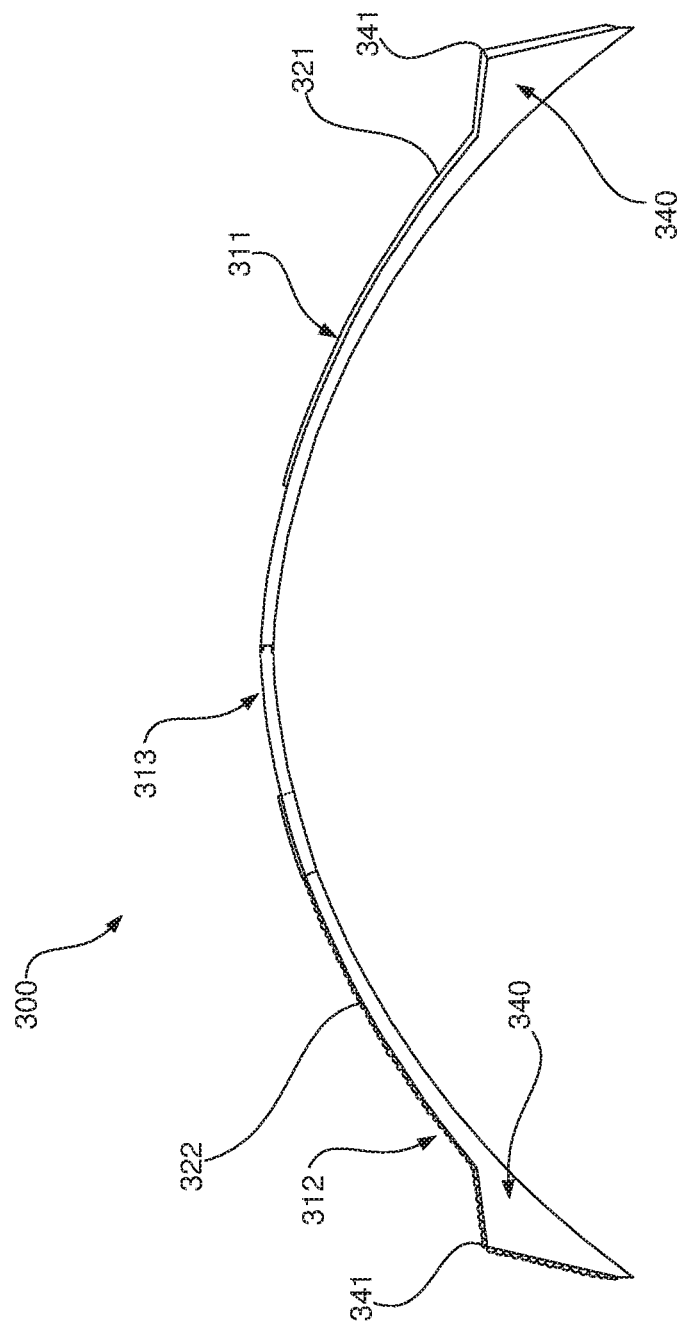
FIG. 3B is a side view of the ocular lens of FIG. 3A.

FIG. 3A depicts a top view and FIG. 3B depicts a profile view of an ocular lens 300 formed of a lens material and including a first, top, or eyelid-facing surface. The first surface may include a first zone 311 and a second zone 312. In some cases, the first surface of the ocular lens 300 may include an optic zone 313. The first zone 311 and second zone 312 may include a plurality of friction control structures 321, 322. The friction control structures 321, 322 and the lens 300 can be substantially similar to, and include any or all of the features of the structures and lenses described herein, such as friction control structure 121 and lens 100. The ocular lens 300 may also include one or more stabilization structures 340.

While the friction control structures 321, 322 may assist in stabilizing the position of the ocular lens 300 on a user's eye, the ocular lens 300 may include additional stabilizations structures 340 which serve to stabilize the position of the ocular lens 300 on the eye. In some examples, and as illustrated in FIGS. 3A and 3B, the stabilization structures 340 may include one or more wedges or prisms having a thickness greater than the thickness of other portions of the ocular lens 300. These stabilization structures 340 may be positioned near an outer edge of the ocular lens 300, for example on a portion of the ocular lens 300 that is disposed over the sclera when the lens is worn on the user's eye.

In some examples, the stabilization structures 340 may be positioned at the outer periphery of the lens 300 and may be located approximately 60% to 70%, for example about 65%, of the distance down from the top of the lens 300. The stabilization structures 340 may include a peak 341 that may be the thickest part of the lens 300, as shown in FIG. 3B. This peak 341 may taper down to a constant edge thickness at the periphery. The stabilization structures 340 thus extract the widest possible stabilizing influence from the eyelid whilst allowing a wide passage of near parallel to parallel thickness through the center and mid peripheral areas of the lens 300. In some embodiments these stabilization structures 340 maximize the stabilizing effects of the upper eyelid by redirecting the eyelid's pressure gradient both down and out, to stabilize the position of the lens 300.

In some examples, a stabilization structure 340 may include one or more grooves, patterns, and/or holes positioned on a front surface, back or eye-facing surface, or front and back surfaces of the ocular lens 300. In some embodiments where the stabilization structures 340 may include grooves and/or patterns, the grooves or patterns may be raised portions of the lens 300 or may be indented into a surface of the lens 300, such as the first surface. In some examples, when the user blinks with the lens 300 on the user's eye, the spongy palpebral and/or tarsal bubar conjunctiva may grip the stabilization structure 340 on the lens surface and orientate the lens 300 by following the slope or orientation of the pattern, grooves or holes in the lens 300. The physiology of the eye and eyelid interrelation may assist in the stabilization of the lens 300. In some examples, eyelid pressure may be utilized to provide a frictional force to orient or stabilize the lens 300.

In some examples, stabilization structures 340 may include waves or striae position on a surface, such as first surface of the ocular lens 300. In some examples, these waves or striae may have a vertical orientation when the lens 300 is worn on a user's eye. In some examples, friction forces between a user's eyelid, such as an upper eyelid, and the stabilization structures 340 may serve to orient or stabilize the lens 300. The orientation of the stabilization structures 340 may provide a path of least resistance or friction for the eyelid travelling over the first surface. In the event that the ocular lens 300 rotates or otherwise moves out of position on the user's eye, this path of least resistance will no longer be substantially aligned with the eyelid's predominant direction of motion. When the user then blinks, the upper eyelid may exert a force on the stabilization structures 340 of the first surface that causes the lens 300 to become repositioned on the eye so that the path of least resistance again aligns with vertical motion of the upper eyelid. In this way, the stabilization structures 340 of the ocular lens 300 may serve to stabilize or assist in stabilizing the position or orientation of the ocular lens 300 on the user's eye.

In some examples, the ocular lens 300 may alternately or additionally include any form of stabilization structures 340 known in the art or developed in the future. In some examples, stabilization structures 340 may be formed by additive or subtractive processes, or combinations thereof. For example, a stabilization structure 340 may be formed by a casting process, a molding process, a printing process, a stamping process, or a liquid or vapor deposition process, or combinations thereof. In some examples, a stabilization structure 340 may be formed by etching, machining, drilling, lathing, or some other subtractive process, or combinations thereof.

Figure 4A:
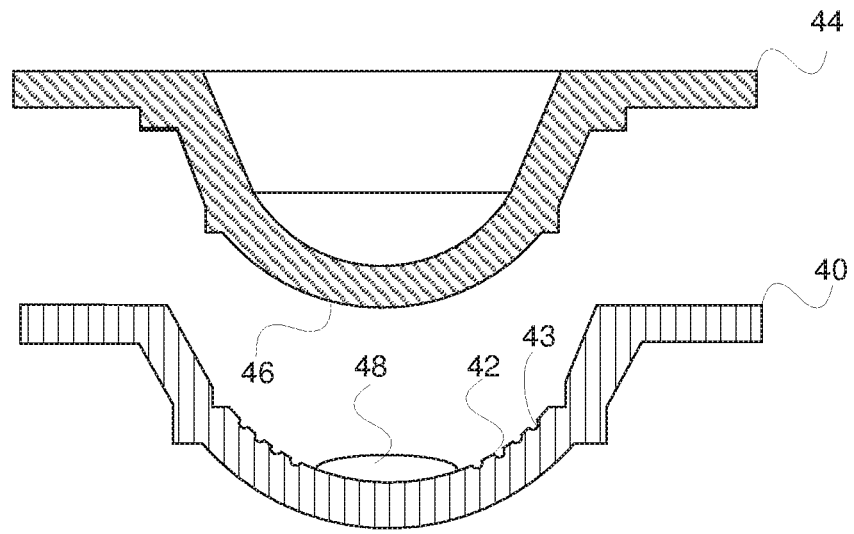
FIGS. 4A-B illustrate schematic diagrams of steps of a method of manufacturing an ocular lens including friction control structures.
Figure 4B:
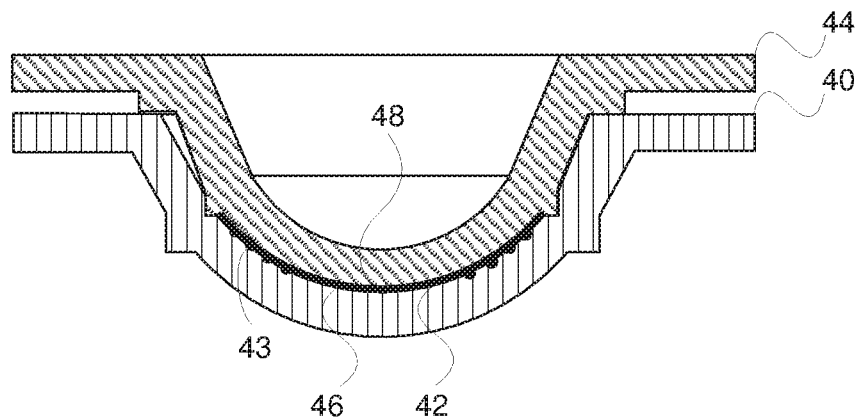

FIGS. 4A-B illustrate schematic diagrams of steps of a method of manufacturing an ocular lens including friction control structures as described herein. FIG. 4A is a cross-sectional view of an example of a cast molding system for casting an ocular lens 400 as described herein. The lens 400 can be substantially similar to, and include any or all of the features of the structures and lenses described herein, such as lenses 100, 200, 300. As illustrated, the cast molding system includes a male mold member 40, having a convex posterior forming surface 42 that defines the geometry and surface finish of the posterior, eyelid-facing, or first surface of the ocular lens cast therein, including friction control structures, if any are present. Similarly, the cast molding system includes a female mold member 44 having a concave anterior forming surface 46 that defines the geometry and surface of the anterior, eye-facing, or second surface of the ocular lens cast therein, including friction control structures, if any are present. As illustrated in FIG. 4A, a liquid lens material can be disposed within the concave surface of the female mold member 44.

In some examples, the posterior forming surface 42 and/or the anterior forming surface 46 of the male mold member 40 and female mold member 44 can include features such as raised or indented features, for forming one or more friction control structures on an anterior or posterior surface of the ocular lens 400 as described herein. In some examples, the features may include a 'negative' shape of the friction control structure to be formed. For example, where the ocular lens 400 includes a friction control structure comprising a plurality of protrusions on the posterior or first surface, the posterior forming surface 42 of the male mold member 44 may include a plurality of indentations or recessed portions 43 corresponding to the shape of the protrusions to be formed.

FIG. 4B is a cross-sectional view of an assembled cast molded system with a liquid lens material 48 disposed between the male mold member 40 and the female mold member 44 to conform to the posterior forming surface 42 and the anterior forming surface 46. In this example, the liquid lens material 48 is deposited into the profile concave surface of the female mold member 44 and engaged by the posterior forming surface 42 during assembly. The liquid lens material 48 can be made from any material suitable for use in ocular lenses. For example, the liquid lens material 48 can be made of any material that is rigid and gas or oxygen permeable when cured, polymerized, or hardened. In some examples, the liquid lens material 48 may include a polymer material. In some examples, the liquid lens material 48 may include siloxane material. In some examples, liquid lens material 48 may include an acrylate material. In some examples, liquid lens material 48 may include cellulose acetate butyrate, siloxane acrylates, t-butyl styrene, flurosiloxane acrylates, perfluroethers, other types of polymers, or combinations thereof. These materials may include various combinations of monomers, polymers, and other materials to form the final polymer. For example, common components of these materials may include HEMA, HEMA-GMA, and other monomers.

In some examples, the liquid lens material 48 can be made of any silicone material and/or hydrogel material. Such material may be formed of polymers, such as tefilcon, tetrafilcon A, crofilcon, helfilcon A&B, mafilcon, polymacon, hioxifilcon B, lotrafilcon A, lotrafilcon B, galyfilcon A, senofilcon A, sifilcon A, comfilcon A, enfilcon A, lidofilcon B, surfilcon A, lidofilcon A, alfafilcon A, omafilcon A, vasurfilcon A, hioxifilcon A, hioxifilcon D, nelfilcon A, hilafilcon A, acofilcon A, bufilcon A, deltafilcon A, phemfilcon A, bufilcon A, perfilcon, etafilcon A, focofilcon A, ocufilcon B, ocufilcon C, ocufilcon D ocufilcon E, ocufilcon F, phemfilcon A, methafilcon A, methafilcon B, vilfilcon A, other types of polymers, monomers, or combinations thereof. These materials may include various combinations of monomers, polymers, and other materials to form the liquid lens material.

The ocular lens 400 can be shaped and sized based on a variety of factors, including the shape and size of the user's eye, various optical properties or surface manipulating forces to be achieved by the ocular lens 400, the design of the friction control structures, and any other combination of factors as desired. The total thickness of the ocular lens 400 can be approximately 0.1 mm to approximately 0.14 mm. The thickness of the ocular lens 400 can vary at different locations on the ocular lens 400. For example, the ocular lens 400 can be thicker near the outer edge of the ocular lens 400 than in the optic zone, and vice versa. Further, some or all of the friction control structures may be thicker than other portions of the lens 400 or other portions of the friction control structures.

Once the liquid lens material 48 is applied to the female mold member 44 and the male mold member 40 is engaged, the liquid lens material 48 may then be exposed to a curing agent (such as temperature, actinic radiation, one or more chemical compounds, or another type of curing agent, or combinations thereof) until cured. As a result, the liquid lens material 48 forms the ocular lens 400 having an anterior surface corresponding to the shape of the anterior forming surface 46 of the female mold member 44 and a posterior surface corresponding to the shape of the posterior forming surface 42 of the male mold member 40. Once the ocular lens 400 is cured, it can be removed.

FIGS. 5A-E illustrate schematic diagrams of steps of a method of manufacturing an ocular lens including friction control structures as described herein. The ocular lens can be substantially similar to, and include some or all of the features of the lenses described herein, such as lenses 100, 200, 300, 400. FIGS. 5A-5E illustrate various components that can be used for making an ocular lens 500 as described herein. A liquid lens material 51 can be applied to a profile 54 of the mold 50, including one or more negative structures 52 corresponding to a friction control structure 520 of the lens 500. The mold 50 with the liquid lens material 51 can be loaded into a spinning structure 58 that is configured to spin the mold 50 so that the liquid lens material 51 centrifugally spreads across the profile 54 into the desired shape of the front surface of the ocular lens 500, including spreading into features 52 on the profile corresponding to friction control structures 520. A curing agent (e.g., temperature, actinic radiation, or another type of curing agent, or combinations thereof) can be exposed to the liquid lens material 51 while the mold 50 is spinning. In some examples, no curing agent is used. As a result of the curing agent, or merely the elapse of time, the liquid lens material 51 may assume a gel state having the desired profile of the ocular lens 500

Figure 5A:
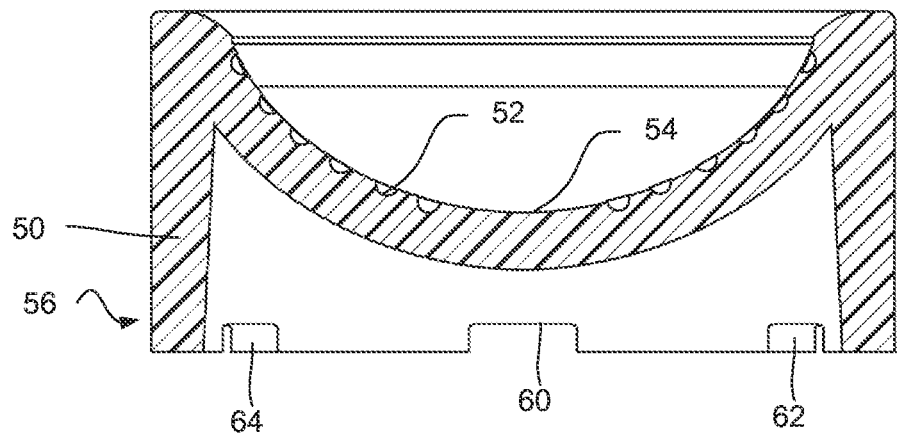

FIG. 5A is a cross sectional view of one embodiment of a mold for a contact lens according to the principles of the present disclosure. In this example, the mold 50 has a base 56 with multiple cut outs 60, 62, 64 that are spaced and shaped to interlock with an internal surface of a spinning structure during a later stage of manufacturing. The profile 54 of the mold 50 is shaped to form the anterior surface of the ocular lens 500 including friction control structures. In some examples, the profile 54 of the mold 50 may include features having a 'negative' shape corresponding to the shape or profile of the friction control structures to be formed.

Figure 5B:
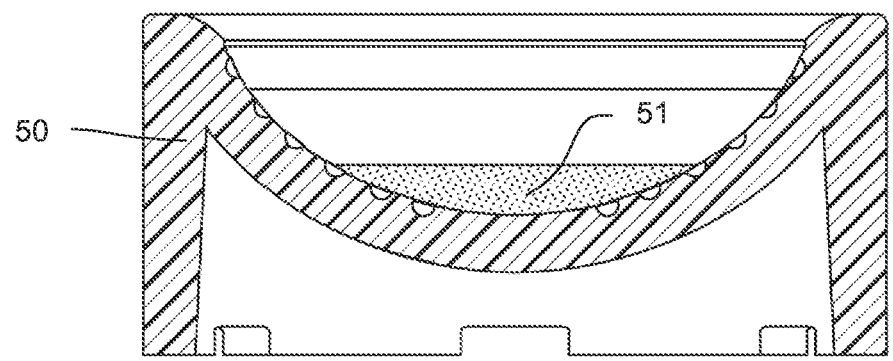

FIG. 5B is a cross sectional view of one embodiment of a mold 50 with a liquid lens material 51 according to the principles of the present disclosure. In this example, the liquid lens material 51 is deposited into the profile 54 of the mold.

The liquid lens material 51 can be made from any material suitable for use in contact lenses. For example, the liquid lens material 51 can be made of any silicone material and/or hydrogel material. Such material may be formed of polymers, such as tefilcon, tetrafilcon A, crofilcon, helfilcon A&B, mafilcon, polymacon, hioxifilcon B, lotrafilcon A, lotrafilcon B, galyfilcon A, senofilcon A, sifilcon A, comfilcon A, enfilcon A, lidofilcon B, surfilcon A, lidofilcon A, alfafilcon A, omafilcon A, vasurfilcon A, hioxifilcon A, hioxifilcon D, nelfilcon A, hilafilcon A, acofilcon A, bufilcon A, deltafilcon A, phemfilcon A, bufilcon A, perfilcon, etafilcon A, focofilcon A, ocufilcon B, ocufilcon C, ocufilcon D ocufilcon E, ocufilcon F, phemfilcon A, methafilcon A, methafilcon B, vilfilcon A, other types of polymers, monomers, or combinations thereof. These materials may include various combinations of monomers, polymers, and other materials to form the liquid lens material.

In some examples, the liquid lens material 51 is made of hydrogel polymers without any silicone. This may be desirable to increase the wettability of the contact lens. In some examples, the liquid lens material 51 is made of silicone hydrogel material.

Figure 5C:
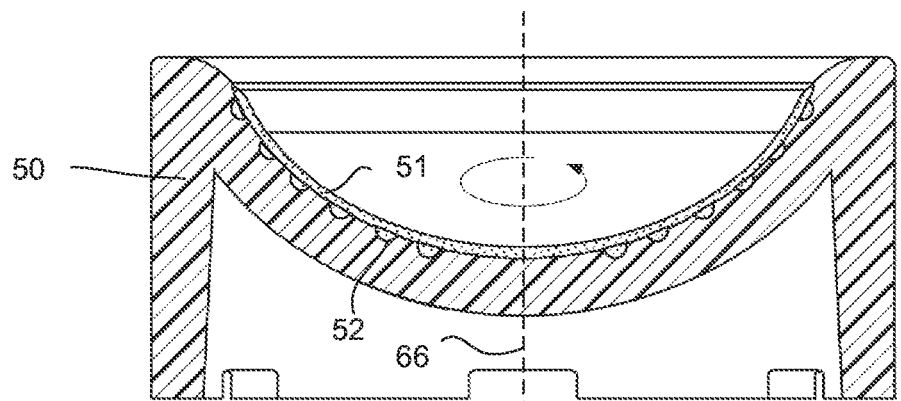

FIGS. 5B and 5C are cross-sectional views of a mold 50 with a liquid lens material 51 centrifugally spreading across a profile 54 of the mold 50. In this example, the mold 50 is spun around a central axis 66 within a spinning structure (58, FIG. 5E). The spinning structure 58 is rotated at a speed and in such a way that forms the desired posterior surface of the liquid lens material 51 in a gel state.

The spinning structure 58 includes a central loading region that can receive the molds 50 that contain the liquid lens material 51. The central loading region may be formed by a glass tube, a metal tube, or another type of structure that can retain the molds 50 in a stacked orientation. In some examples where actinic radiation is used as the curing agent, the spinning structure 58 may have an opaque material, a semi-transparent material, or a transparent material that include a sufficient amount of openings to allow the actinic radiation into the central loading region. In the example of FIG. 5E, the spinning structure 58 includes multiple guideposts 74 that retain the molds 50 in a stacked orientation. The spinning structure 58 also includes a region 76 that can be used to attach to a spinning driver, such as a motor.

The spinning structure 58 may be programmed to rotate in a precise manner to form the desired posterior surface of the gel state liquid lens material 51 including one or more friction control structures. The program that causes the spinning structure 58 to rotate can be modified to create a desired profile for different users based on each user's individual prescription. The curing agent may be applied to the liquid lens material 51 while the spinning structure 58 rotates the molds 50. As a result, gel state liquid lens material 51 is formed while the spinning structure rotates. In some examples, the gel state liquid lens material 51 is fully cured within the spinning structure. In some other examples, the gel state liquid lens material 51 may be fully cured over the course of multiple curing stages. For example, the gel state liquid lens material 51 may be cured in the spinning structure 58 to a point where the liquid lens material retains its shape but is not fully cured.

Figure 5D:
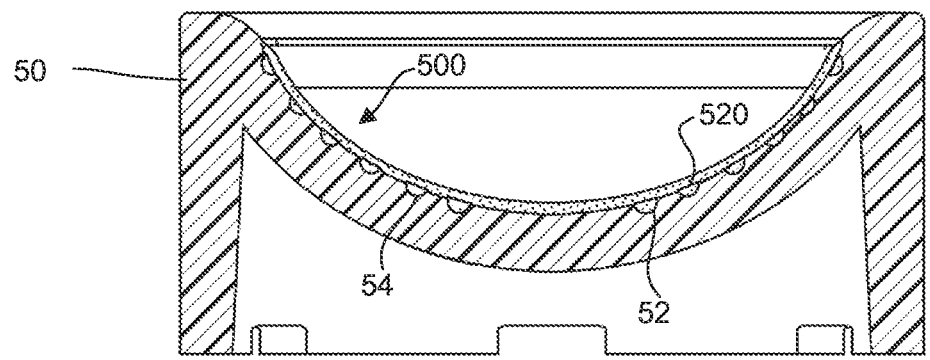
Figure 5E:
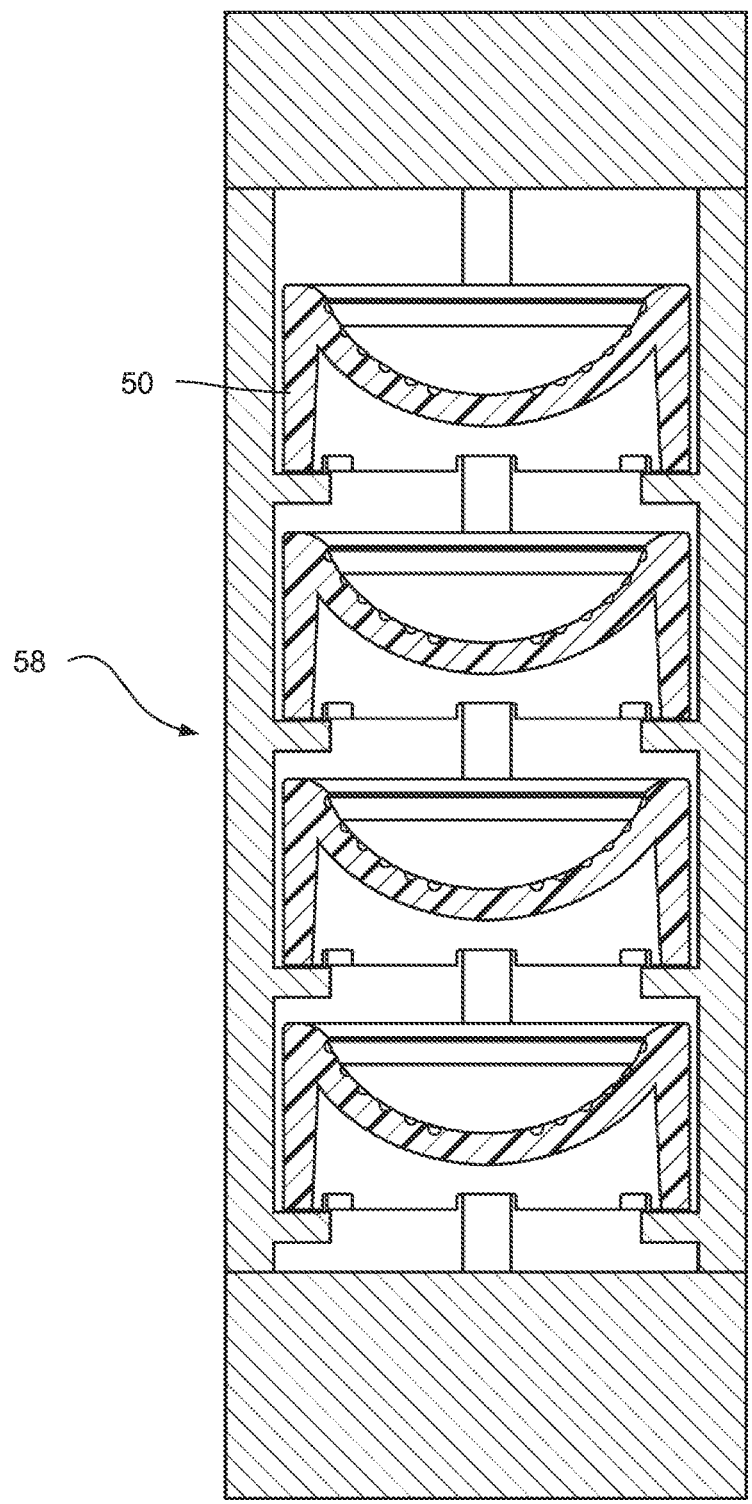

FIG. 5D illustrates a cured ocular lens 500 formed from liquid lens materials 51 and including friction control structures 520. In some examples, the lens 500 may be substantially similar to the lens 100 described herein with respect to FIGS. 1A and 1B. At this stage, the mold 50 with the ocular lens 500 may be removed from the spinning structure to finish curing in another environment. A spinning structure that is compatible with the principles described herein is described in U.S. Pat. No. 9,193,119 issued to Stephen D. Newman. U.S. Pat. No. 9,193,119 is herein incorporated by reference for all that is discloses.

As used herein with reference to contact or ocular lenses, the terms 'top' or 'upper' generally refer directionally to the outer surface of the contact lens when worn as intended by a user, while the terms 'bottom' or 'lower' generally refer directionally to the inner surface, or eye-facing surface of the lens. Such terms are used for reference and to aid in the understanding of the present disclosure and are not intended to limit the scope of the present disclosure in any way. For example, as used herein, one embodiment of the exemplary lens describes the variable capacitance sensor being formed on the outer top surface of a contact lens. However, the variable capacitance sensor can be formed on the top, bottom, or inner layer of the lens.

As used herein, the term "combination," may refer to one, none, or any number of the items listed. For example, a combination of items A and B may include items A and B, only item A, only item B, or neither item A nor item B.

Unless otherwise indicated, all numbers or expressions, such as those expressing dimensions, physical characteristics, etc., used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

In addition, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

We claim:
1. An ocular lens, comprising:
 a lens body including a first surface, the first surface including;
  a first zone including a first plurality of friction reduction structures having a first orientation;
  a second zone including a second plurality of friction reduction structures having a second orientation; and
  an optic zone having an area free of friction reduction structures, wherein the first zone is disposed outside the optic zone and surrounds at least a portion of the optic zone and the second zone is disposed outside the optic zone and the first zone.

2. The ocular lens of claim 1, wherein the friction reduction structures comprise at least one patterned feature.

3. The ocular lens of claim 2, wherein the patterned feature comprises one or more of a nano-structured feature, a micro-structured feature, or a wave structure.

4. The ocular lens of claim 1, wherein the plurality of friction reduction structures enhances the wettability of the first surface of the lens body.

5. The ocular lens of claim 1, wherein the plurality of friction reduction structures promote a natural blink motion of an eyelid.

6. The ocular lens of claim 1, wherein each of the plurality of friction reduction structures of one or more of the first zone and second zone is defined by an arc and the plurality of friction reduction structures are arranged in a substantially concentric manner.

7. The ocular lens of claim 1, wherein the friction reduction structures comprise a combination of channels and ridges.

8. The ocular lens of claim 1, wherein the first zone extends from an edge of the lens body to a position on the first surface greater than one radius of the first surface away from the edge of the lens body.

9. The ocular lens of claim 1, wherein the second zone extends from an edge of the lens body to a position on the first surface less than one radius of the first surface away from the edge of the lens body.

10. The ocular lens of claim 1, wherein the first zone and the second zone cover substantially all of the first surface outside of the optic zone.

11. The ocular lens of claim 1, further including one or more prisms formed along an outer edge of the lens body to substantially orient the lens body in a desired position on an eye.

12. The ocular lens of claim 1, further comprising a chemical surface modifier.

13. An ocular lens, comprising:
   a lens body including a first surface, the first surface including;
      an optic zone positioned at a center of the lens body;
      a first zone including a first plurality of friction reduction structures having a first orientation in alignment with a movement of an upper eyelid during blinking;
      a second zone substantially adjacent to the first zone, including a second plurality of friction reduction structures having a second orientation in alignment with a movement of a lower eyelid during blinking, wherein the optic zone is free of friction reduction structures; and
   at least one stabilizing structure configured to engage a blinking eyelid and orient the ocular lens.

14. The ocular lens of claim 13, wherein the friction reduction structures comprise at least one patterned feature.

15. The ocular lens of claim 13, wherein the plurality of friction reduction structures enhances the wettability of the first surface of the lens body.

16. The ocular lens of claim 13, further comprising a plurality of stabilizing structures disposed on a periphery of the ocular lens.

17. The ocular lens of claim 13, wherein the at least one stabilizing structure comprises a wave or a stria.

18. An ocular lens, comprising:
   a lens body including a first surface, the first surface including;
      a first zone including a first plurality of friction reduction structures having a first orientation, the friction reduction structures comprising at one or more patterned nano or micro features arranged substantially parallel to one another, wherein the patterned nano or micro features comprise a wave structure that extends perpendicular to the first surface;
      a second zone including a second plurality of friction reduction structures having a second orientation substantially perpendicular to the first orientation, the friction reduction structures comprising one or more patterned nano or micro structures arranged substantially parallel to one another.

19. The ocular lens of claim 18, wherein the friction reduction structures comprise a combination of indentations and protrusions.

20. The ocular lens of claim 19, wherein the indentation or protrusions have a combination of substantially rounded profiles, substantially rectangular profiles, substantially triangular profiles, and irregularly shaped profiles.

21. The ocular lens of claim 18, further comprising at least one stabilizing structure configured to engage a blinking eyelid and orient the ocular lens.

* * * * *